No. 856,518. PATENTED JUNE 11, 1907.
W. DEAN.
DROPPING DEVICE.
APPLICATION FILED NOV. 17, 1905.
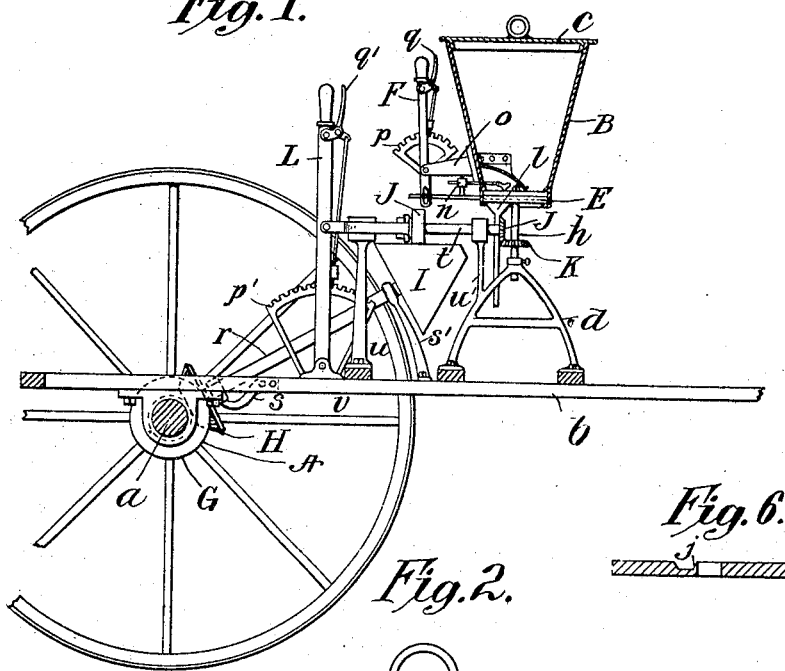
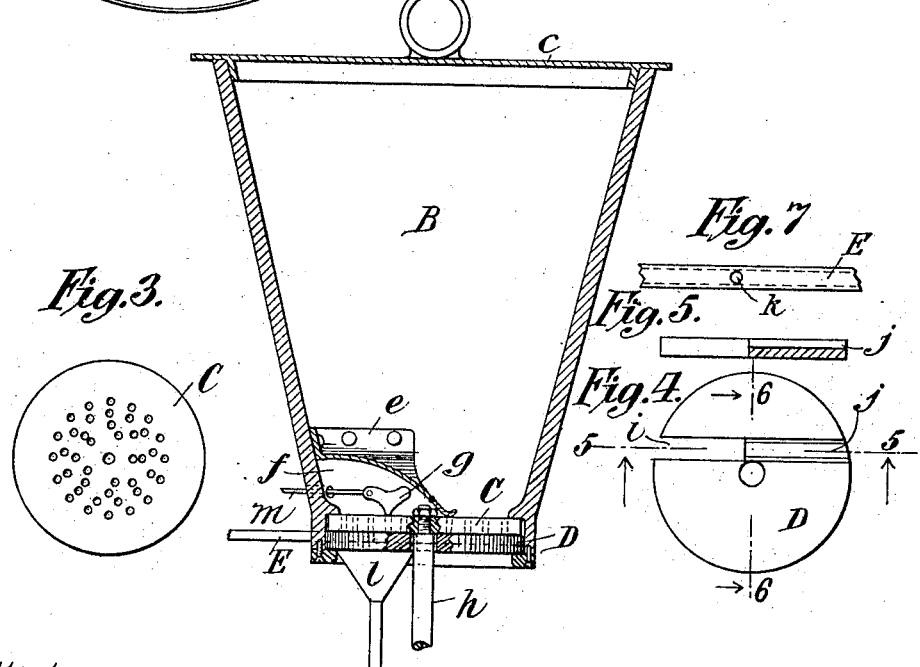
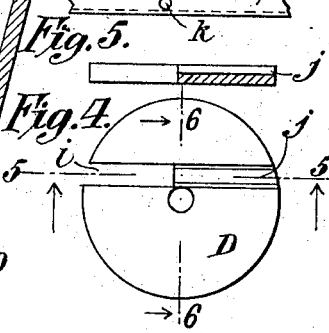
Attest:
Inventor: Whitney Dean
by W. P. Preble Jr.
his Atty.

UNITED STATES PATENT OFFICE.

WHITNEY DEAN, OF GREENWOOD, NEBRASKA.

DROPPING DEVICE.

No. 856,518.　　　Specification of Letters Patent.　　　Patented June 11, 1907.

Application filed November 17, 1905. Serial No. 287,791.

*To all whom it may concern:*

Be it known that I, WHITNEY DEAN, a citizen of the United States, and a resident of Greenwood, county of Cass, State of Nebraska, have invented certain new and useful Improvements in Dropping Devices, of which the following is a specification.

In the operation of machines, as ordinarily constructed, the kernels of corn are dropped one at a time at fixed intervals; the frequency of dropping depending upon the speed of the machine in traveling over the ground. Where the inequalities of the ground produce inequalities of the speed of traveling, the corn is obviously dropped irregular. It is also true that by this uniform dropping no allowance is made for the fact that in more fertile ground more corn can safely be planted than in less fertile.

The object of my invention is to provide a dropping device so constructed as to be capable of quickly varying the quantity of corn dropped, that is, the intervals between successive kernels so that when passing over less productive soil less corn is dropped and in passing over more productive soil more corn is dropped.

To accomplish this object I provide a dropping device in which the usual dropping plate or screen is capable of adjustment, both with regard to speed of rotation and also with regard to the number of kernels to be dropped during each revolution of the plate or screen. The operator can readily control these two forms of adjustment by suitable shifting devices and can, therefore, vary the interval by which kernels are dropped either by increasing or decreasing the speed of the revolving plate or by varying the dropping apertures without altering the speed of rotation, or both.

One form of my invention is shown in the accompanying drawings in which:

Figure 1, is a side view showing the dropping or drum hopper in section. Fig. 2, is an enlarged section of the dropping device. Fig. 3, is a top view of the dropping plate with the improved arrangement of dropping holes. Fig. 4, is a top view of a stationary disk located in the bottom of the hopper. Fig. 5, is a vertical section on line 5—5 of Fig. 4. Fig. 6, is a vertical section on line 6—6 of Fig. 4 and Fig. 7, is a detail of the dropping slide.

Same letters indicate similar parts in the different figures.

A is one of the wheels upon which the planter frame is mounted having the axle $a$ and the usual supporting platform $b$; the shafts not being shown.

B is the dropping drum or hopper of usual construction provided with a removable cap $c$ through which corn is poured into the hopper. This hopper is supported from the platform $b$ by the frame $d$ and may be located either in front of or behind the driver's seat (not shown). Near the bottom of the hopper and stretching across the bottom is a curved plate $e$ which is fastened to the inner wall of the hopper and serves, not only to guide the corn to one side but also creates a covered chamber $f$ in which the clearing or ejecting device $g$ can operate freely.

C is the revolving dropping plate or screen, which is journaled in the bottom of the hopper upon the shaft $h$ turning in the frame $d$ and operated from the bearing wheel A, as hereafter described. As shown in Fig. 3 this revolving plate C is perforated. Instead of a single row of apertures in which kernels of corn can be lodged, I provide this plate with a number of concentric rows; the number of holes in each row increasing toward the circumference of the plate. As shown, the inner row has five holes, the next eight, the next twelve, etc. so that during each revolution of the plate 5, 8, 12 or 16 kernels of corn may be dropped according to which row of holes is employed for dropping purposes. It will be understood that the corn in the hopper outside the dividing plate $e$ will drop one kernel at a time into each of the holes of the plate C as it passes outside of the chamber $f$. An aperture being filled with one kernel can obviously not receive any more until that kernel is displaced.

The revolving plate C rests upon the stationary disk D immediately below it. This disk has a longitudinal slot $i$ (seen best in Fig. 4) half of which is open and the other half is provided with a slide rest or shelf $j$. In this slot and supported by the slide rest $j$ is the slide E which has a single hole $k$, slightly larger than the holes through the plate C. The kernels of corn which have lodged in the holes of the revolving plate rest upon the stationary plate D until in their rotation they are brought over the hole $k$ when the kernel is pushed, by means of the dislodging device or ejector $g$, through and falling into the chute which leads the kernel down in the usual way.

The disengaging device $g$ is pivoted to the rod $m$ passing through the wall of the hopper and supported by the post $n$ on the slide E outside the hopper. The slide is thrown in and out by means of the handle F pivoted to the bracket $o$ on the side of the hopper and within easy reach from the driver's seat. To hold the slide in any desired fixed position the toothed sector $p$ is provided and a spring catch $q$ which engages the teeth in the sector. It will be understood that the object of moving the slide is to bring the hole $k$ in the slide into alinement with the desired row of apertures in plate C and that the knocker or disengager device $g$ is so set as always to be immediately over the hole $k$ so that the kernel of corn in the pre-determined row is always knocked through into the chute while no other kernel is allowed to go through. It will thus be seen that by shifting the knocker $g$, hole $k$ from one row of apertures to another will determine the number of kernels sent down the chute for each revolution of the revolving plate C.

Revolution is imparted to the plate C from the bearing wheel A as follows: The axle $a$ carries a beveled gear G which meshes with a beveled gear H on an inclined shaft $r$ journaled in the brackets $s$ $s'$ on the platform $b$ and terminating at the upper end in the friction cone I. Upon this cone rides the friction roller J slidingly mounted on the shaft $t$ which is journaled in posts $u$ $u'$ supported from the platform $b$ and bearing at the inner end a beveled gear J which engages the beveled gear K upon the shaft $h$ previously mentioned.

It is obvious that the speed of revolution transmitted to the plate shaft $h$ will vary with the position of the friction roller J on the friction cone I; the nearer the roller is to the apex of the cone the lower will be the speed transmitted and the nearer it is to the base of the cone the faster the speed. The sliding of the roller along the shaft is brought about by the handle L, which is pivoted to the brackets $v$ on the platform $b$ and is within easy reach of the rider. When set in the desired position with a view to the speed wanted the handle is locked by means of the section $p'$ and catch $q'$ which are supported on the handle L and platform $b$ respectively.

It will thus be seen that while the motion of the machine over the ground and, therefore, the rotation of the bearing wheel A may be at a uniform speed the rider can increase or decrease the speed of the revolving plate C by shifting the transmitting friction roller J from one position to another on the friction cone so that my improved dropping device has two capabilities of adjustment, namely, the speed of the plate C and the number of kernels to be dropped for each revolution of the plate. These two adjustments will enable the planter to plant corn at each moment at such intervals as would be best adapted to the character of the ground in which the planting is to be done.

I claim:—

A dropping device which consists of a hopper provided with a perforated plate mounted upon a vertical shaft, a beveled gear upon said shaft, a sliding shaft carrying a beveled gear and adapted to be thrown into and out of engagement with said first mentioned gear, a friction roller slidingly mounted on said sliding shaft, and a friction cone engaging therewith rotated from the main axle.

WHITNEY DEAN.

Witnesses:
 H. A. WIGGENHORN,
 EDWYN D. MILLS.